US012533018B2

(12) United States Patent
Manigoff et al.

(10) Patent No.: US 12,533,018 B2
(45) Date of Patent: Jan. 27, 2026

(54) INTRAORAL SCANNING SYSTEM AND METHOD FOR USING REMOTE RESOURCES

(71) Applicant: 3SHAPE A/S, Copenhagen K (DK)

(72) Inventors: Jesper Lomborg Manigoff, Copenhagen K (DK); Poul Martin Ravn, Copenhagen K (DK)

(73) Assignee: 3Shape A/S, Kobenhavn K (DK)

( * ) Notice: Subject to any disclaimer, the term of this patent is extended or adjusted under 35 U.S.C. 154(b) by 249 days.

(21) Appl. No.: 18/512,468

(22) Filed: Nov. 17, 2023

(65) Prior Publication Data

US 2024/0164632 A1  May 23, 2024

(30) Foreign Application Priority Data

Nov. 21, 2022 (EP) .................................. 22208563

(51) Int. Cl.
*A61B 1/247* (2006.01)
*G06T 15/00* (2011.01)
*G16H 40/20* (2018.01)

(52) U.S. Cl.
CPC ............ *A61B 1/247* (2013.01); *G06T 15/005* (2013.01); *G16H 40/20* (2018.01); *G06T 2210/41* (2013.01)

(58) Field of Classification Search
USPC ......................................................... 348/66
See application file for complete search history.

(56) References Cited

U.S. PATENT DOCUMENTS

| 11,529,219 B2 * | 12/2022 | Fan .......................... A61B 1/24 |
| 2022/0233283 A1 | 7/2022 | Fridman et al. |
| 2022/0369910 A1 * | 11/2022 | Gorfinkel ............. A61C 9/0053 |
| 2023/0031392 A1 * | 2/2023 | Lo Russo ................ A61B 1/24 |
| 2023/0042643 A1 * | 2/2023 | Saphier .................. A61C 9/006 |

FOREIGN PATENT DOCUMENTS

WO   2022038134 A1   2/2022

* cited by examiner

*Primary Examiner* — Nigar Chowdhury
(74) *Attorney, Agent, or Firm* — BUCHANAN INGERSOLL & ROONEY PC

(57) ABSTRACT

The intraoral scanning system includes an intraoral scanning device configured to acquire light information reflected from a dental object and further includes one or more processors connected to the intraoral scanning device. The one or more processors are configured to determine, in real time, surface information from the light information, and generate a three-dimensional surface model of a dental object using the surface information. One or more remote computers includes a resource pool, wherein the system provides temporary access for the intraoral scanning device to one or more resources of the resource pool based on a predefined performance mode of the scanning session. Each of at least two predefined performance modes is configured to operate the intraoral scanning device with a different number of resources from the resource pool and/or with a different type of resources from the resource pool.

15 Claims, 8 Drawing Sheets

INTRAORAL SCANNING SYSTEM AND METHOD FOR USING REMOTE RESOURCES

FIELD

The disclosure relates in general to the use of remote resources by an intraoral scanning device in an intraoral scanning session, and in particular to the use of remote resources associated with a predefined performance mode for a scanning session.

BACKGROUND

Intraoral scanning provides useful information about the characteristics of a dental object under examination. Intraoral scanning may be performed using an intraoral scanning device, that may be handheld, and includes a processing unit for obtaining scan data from the dental object. The intraoral scanning device may be connected to a display for displaying information relating to the scanned dental object, such as visualizing a digital representation of a scanned tooth. The intraoral scanning device may further be connected to a computer providing more resources for processing the obtained scan data and/or performing the displaying of information on the display, such as generating a 3D model of the scanned dental object.

The computer may be located locally and in the vicinity of the intraoral scanning device, such as in the same room, but may, in another configuration, also be located elsewhere remotely on a remote computer. The intraoral scanning device may comprise a wireless interface and connected to the remote computer via a wireless network. A such configuration where the intraoral scanning device, via a wireless network, is connected to a remote computer, may be described as an intraoral scanning system where at least a part of the data processing is performed in the "cloud", which may be considered as a reference to a remote computer.

Unfortunately, with such an intraoral scanning system comprising an intraoral scanning device that is connected to a remote computer, the user has to decide on performance (e.g., low-end, mid-range, high-end, premium, etc.) at the time of purchase of the intraoral scanning device or the intraoral scanning system. As a consequence, if the user purchases a low-end intraoral scanning device, i.e. an intraoral scanning with a low price point, r a low-end intraoral scanning system, i.e. an intraoral scanning system with a low price point, the user will not have the option of performing high-end scans with the low-end intraoral scanning device or low-end intraoral scanning system. Alternatively, if the user purchases a high-end intraoral scanning device or high-end intraoral scanning system, the consumer will have to pay a higher price, even when the intraoral scanning device or intraoral scanning system is used for low-end scanning.

SUMMARY

An aspect of the present disclosure is to allow an intraoral scanning device to operate in different performance modes using different resources, where the different performance modes may be associated to different price points of the intraoral scanning device.

A further aspect of the present disclosure is to allow a user of the intraoral scanning device to upgrade or downgrade the intraoral scanning device remotely via a network. Thereby, the period of which the scanner is not in operation is reduced from several days to few minutes as the user does not need to ship the scanner to the manufacture for being upgraded or downgraded.

According to the aspect, an intraoral scanning system may comprise an intraoral scanning device. The intraoral scanning device may be configured to acquire light information reflected from a three-dimensional dental object during a scanning session, wherein the scanning session is a period of time in which a scan is performed using the intraoral scanning device". The intraoral scanning device may be a handheld intraoral scanner.

The intraoral scanning system may further comprise one or more processors. The one or more processors may be operably connected to the intraoral scanning device. The one or more processors may be configured to determine, in real time, surface information from the light information, and generate a three-dimensional (3D) surface model of a dental object using the surface information. The one or more processors may comprise one processor, such as a CPU (central processing unit), with one or more processor cores. The one or more processors may comprise more than one processor, such as more a plurality of CPUs, such as a processing cluster, wherein each of the plurality of CPUs includes one or more processor cores. The intraoral scanning device and the one or more processors may be separate entities.

The intraoral scanning device and the one or more processors being separate entities may allow the processing of the data to occur outside the intraoral scanning device and may thus allow for using remote resources or may allow for a cloud-based processing.

The expression "remote" or "remotely" is to be understood as a location or a reference to a location, which is geographically, technically or logistically difficult to access, to reach, or to connect to, from a first location, using a wired connection, such as a data cable, or which is physically inaccessible.

Such a location may for example be a building, a city, or a country, which is located at a different location than a building, a city, or a country, than the first location, respectively.

Accordingly, the expression remote computers, remote processors, remote resources etc, are to be understood as located at remote locations as defined above, which are technically or logistically difficult to access, to reach, or to connect to, using a wired connection, such as a data cable.

For example, the intraoral scanning device, may be located at the Equator of the Earth and connected, via a wireless network of the intraoral scanning system and via the internet, to remote resources located within the polar circle of the northern hemisphere.

A such arrangement may for instance reduce the release of greenhouse gasses into the atmosphere due to the utilization of natural cooling of the remote resources, which may be computing processors that produce heat when operating, due to the proximity of the remote resources to the arctic region, and hence may reduce the contribution to increasing global warming.

Similarly, the expression "local" or "locally" is understood as being a location or a reference to a location which can be accessed, reached, or connected to, from a first location, using a wired connection, such as a data cable, or using a local wireless network, such as a wireless local area network (WLAN), such as a Wi-Fi connection to a router.

Thus, in the context of this application, a local device or local resources are understood as being located in a same room in a building or in a different room in the same building.

For example, the intraoral scanning device, may be located in a room, such as a dentist's clinic, and connected, via a data cable or via a wireless connection, to local resources, such as a server, a desktop computer, a laptop, a tablet, or a smartphone, located in the same room as the intraoral scanning device or located in a different room in the same building as the intraoral scanning device.

At least one of the one or more processors may be one or more remote computers.

In one aspect, where the system only comprises one processor, the processor may be located remotely relative to the intraoral scanning device, and the intraoral scanning device may be operably connected to the processor using a network connection, such as a wireless network, such as the internet, a mesh network, a short-range network, or a long-range network, such as a cellular network, i.e., 3g, 4g, 5g, or 6g. The one processor may comprise one or more processor cores. The processor may further be a computer, a tablet, a server, or more than one computer interconnected with each other. The one or more remote computers may be part of one or more groups of interconnected computing systems. The intraoral scanning device and the one or more remote computers may be separate entities.

The one or more cores or one or more processor cores may be processing units configured to read and execute program instructions.

In another aspect, where the system comprises more than one processor, the processors may be located remotely relative to the intraoral scanning device, and the intraoral scanning device may be operably connected to the processors using a network connection, such as a wireless network, such as the internet, a mesh network, a short-range network, or a long-range network, such as a telephone network, i.e., 3g, 4g, 5g, or 6g. The processors may be arranged inside one or more remote computers, one or more servers, or may be one or more remote computers or one or more servers. The processors may be several CPU's or a CPU comprising several processing cores. The intraoral scanning device and the one or more remote computers may be separate entities.

Having all the processors located remotely relative to the intraoral scanning device and outside of the intraoral scanning device may allow the intraoral scanning device to operate with a much simpler processor that allows a lower production cost of the intraoral scanning device lower heat generation, and a reduction in size and weight.

Alternatively, where the system comprises more than one processor, the processors may be distributed locally and remotely such that, for example, one processor is locally arranged inside the intraoral scanning device or inside a computer, a tablet, or a laptop, arranged in the nearby vicinity of the intraoral scanning device, such as for example in the same room, and where another processor is arranged remotely inside a remote computer operably connected to the intraoral scanning device using a wireless network, such as the internet, a mesh network, a short-range network, or a long-range network, such as a telephone network, i.e., 3g, 4g, 5g, or 6g. In a such arrangement, the remote computer may be referred to as cloud computing. The locally arranged computer may comprise a CPU comprising one or more processing cores. The remotely arranged remote computer may be one CPU comprising one or more processing cores, or may be more than one CPU each comprising one or more processing cores. The intraoral scanning device and the remote computer may be separate entities.

Having one processor arranged inside the intraoral scanning device and one processor arranged remotely outside the intraoral scanning device may allow the intraoral scanning system to distribute the processing operations between a local processor and a remote processor, or, may allow the intraoral scanning system to switch between a local processor and a remote processor. A such distribution or switching between the local processor and the remote processor may allow the intraoral scanning system, to for example, perform simpler processing operations on a local processor, and more complexed processing operations on remote processors.

The one or more remote computers may include a resource pool. The resource pool may comprise resources that are configured to process data. The resource pool may comprise resources such as hardware, or a combination of hardware and software, that are configured to process data and/or information for one or more of; scan modalities, accuracy, frame rate, colour, scan engine/reconstruction, connection/data transfer, virtual computer, user interface, and artificial intelligence/machine learning (detailed examples will be provided in the detailed description section of this disclosure). The resource pool may comprise a CPU with more than one cores, more than one CPU, and/or one or more CPU's in combination with at least one algorithm that is configured to process data. The intraoral scanning device and the resource pool may be separate entities. The resource pool may be cloud-based computing, such that the resources of the resource pool may be arranged in one or more remote computers and may be operably connected to the intraoral scanning device using a wireless network, such as the internet, a mesh network, a short-range network, or a long-range network, such as a telephone network, i.e., 3g, 4g, 5g, or 6g. The one or more remote computers may be part of the cloud-based resource pool such as a computer cluster (or just "cluster" for short) which may be collections of relatively low-cost standalone computers that are networked together. These inter-connected computers may be endowed with software to coordinate programs on (or across) those computers, and they can therefore work together to perform computationally intensive tasks.

Having a resource pool with the above mentioned resources may allow the user of the intraoral scanning system to select any of the resources or a combination of the resources, and may thereby allow an intraoral scanning device to run in different performance modes, as an on-demand solution.

The system may be configured to switch between one or more resources from the resource pool and one or more local resources of the intraoral scanning device.

A such switching between local resources and remote resources may allow the intraoral scanning system to for example perform simpler processing operations on a local processor, and perform more complexed processing operations on remote processors.

The system, via a network of the system, may further provide temporary access to the intraoral scanning device to a set of resources from the resource pool based on a predefined performance mode of the scanning session. The set of resources may comprise a combination of hardware resources, a combination of software resources, or a combination of hardware and software resources.

The hardware resource may comprise processors such as CPUs, wherein each of the CPUs may have one or more processing cores, and/or may be graphics processing units (GPUs). Software resources may be one or more algorithms, or instructions to perform computational operations, in a computer readable medium that is configured to process data.

The system may further provide temporary access for the intraoral scanning device to one or more resources of the resource pool based on a predefined performance mode of the scanning session. Further, the one or more remote computers, via a network of the system, may provide temporary access for the intraoral scanning device to the one or more resources of the resource pool based on the predefined performance mode of the scanning session. The temporary access to the one or more resources may be provided before, during or after the scanning session, depending on the selected one or more resources.

The predefined performance mode may be determined based on a user input, a user profile, or a client profile.

Basing the predefined performance mode on a user input, a user profile, or a client profile, allows the intraoral scanning system to identify the selected predefined performance mode using different selection options indicative of the desired predefined performance mode. The above will be explained further using examples in later sections.

The predefined performance mode may be instructions in a computer readable medium provided in the intraoral scanning device, in a client device connected to the intraoral scanning device, such as a computer, a tablet, or a smartphone, in one or more of the one or more remote computers, or elsewhere in the intraoral scanning system, and may be configured to be executed by a processing unit, such as a CPU, in the intraoral scanning device, in the client device connected to the intraoral scanning device, in one of the one or more remote computers, or elsewhere in the intraoral scanning system.

The predefined performance mode may be configured to operate the intraoral scanning device using:
one or more user selected resources of the resource pool, wherein the resource pool includes similar or different type of resources,
a set of resources from at least two sets of resources from the resources pool, each set comprising a different combination of number of resources and/or different type of resources of the resource pool, or
a predefined number and/or type of resources of the resource pool.

The predefined performance mode may be one of at least two predefined performance modes that may be selected amongst several modes of operating the intraoral scanning device, such as a low-end, a mid-range, a high-end, a premium, a user defined, or a default mode of operation.

In the present disclosure, the expressions "low-end", "mid-range", "high-end", and "premium", are understood as referring to modes of operating the intraoral scanning device with certain technical specs or a certain amount and/or type of processing performance.

It is understood, that an intraoral scanning devise operating in a low-end performance mode is operating with lower technical specs, or has access to a lower amount and/or type of resources, than when operating in a medium-range performance mode, which in turn operates with lower technical specs, or has access to a lower amount and/or type of resources, than when operating in a high-end performance mode, which in turn operates with lower technical specs, or has access to a lower amount and/or type of resources, than when operating in a premium performance mode. The expression "technical specs" is to be understood as resources such as processing resources, computational processing, or other performance parameters for data handling, analysis, or processing, such as software or algorithms. The user defined mode of operation may allow a user to select individual resources, while the default mode of operation may be pre-set, such that, for example if no predefined performance mode is selected, the intraoral scanning device will operate in the default mode.

The processing performance may correspond to the processing performance of low-cost computers, average-cost computers, expensive computers, and premium computers, respectively.

In this regard, low-cost computers may be computers that are not suitable for performing complex processing tasks, but may be suitable for word processing or internet browsing. Average-cost computers may be computers that are further suitable for performing more complex processing tasks, such as running simple games and video streaming. Expensive computers may be computers that are yet further suitable for performing complex processing such as running complex games and CAD software. Premium computers may be computers that are yet further suitable for performing more complex processing such as handling a large amount of data or video editing.

For example, when a low-end performance mode of operating the intraoral scanning device is selected, the intraoral scanning device may only have access to one computational processing unit (CPU). In another example, when a medium-range performance mode is selected, the intraoral scanning device may have access to two CPUs. In yet another example, when a high-end performance mode is selected, the intraoral scanning device may have access to two CPUs and to an algorithm for generating a 3D model. In a further example, when a premium performance mode is selected, the intraoral scanning device may have access to two CPUs, an algorithm for generating a 3D model, a graphics processing unit (GPU), and Artificial Intelligence.

The predefined performance mode may be one of at least two predefined performance modes. The predefined performance mode may be one of several predefined modes, such as a low-end, a mid-range, a high-end, a premium, a default, and a user defined performance mode.

Each of the at least two predefined performance modes may be configured to operate the intraoral scanning device with a different number of resources from the resource pool and/or with a different type of resources from the resource pool.

One of the at least two predefined performance modes may comprise one of a low-end mode, a mid-range mode, a high-end mode, a premium mode, a user defined mode, or a default mode, and another one of the at least two predefined performance modes may comprise a different one of a low-end mode, a mid-range mode, a high-end mode, a premium mode, a user defined mode, or a default mode.

Having an intraoral scanning system that comprises an intraoral scanning device that is configured to be operated in more than one predefined performance modes that differ in number and/or type of accessible resources from a resource pool may allow the intraoral scanning device to run in different performance modes independent of the specifications of the scanning device at the time of purchase.

The temporary access may be achieved for example by having the system configured to disallow access of the one or more resources for the scanning session in response to the intraoral scanning device no longer utilizing the one or more resources.

Providing a temporary access for the intraoral scanning device to one or more resources of the resource pool based on a predefined performance mode may allow for an on-demand solution for operating an intraoral scanning device.

The temporary access may further be provided by a resource controller which may be an algorithm, that may be a computer readable medium, that may be provided in a software in the intraoral scanning device, in a local computer connected to the intraoral scanning device and part of the intraoral scanning system, in the one or more remote computers, in a computer connected to the one or more remote computers and part of the intraoral scanning system, or in the resource pool. The resource controller may be configured to provide access for the intraoral scanning device to the one or more resources based on a user input, a user profile, and/or a client profile.

Thus, the intraoral scanning system may further comprise a resource controller that may be configured to control the access to the one or more resources.

The access may be based on the predefined performance mode of the scanning session and may be associated with the generation of the three-dimensional (3D) surface model of the dental object using the surface information.

A resource controller may allow the intraoral scanning device to access the resources of the resource pool according to a user input, a user profile, and/or a client profile.

In a situation where the access is based on the user input, the resource controller may be configured to allow access to the one or more resources according to a selection performed by a user of the intraoral scanning device.

For example, a user, such as a dentist, may upon the initiation of a scanning session, select a performance mode for the scanning session, that will decide the number and/or type of resources that will be accessed by or allocated for the intraoral scanning device from the resource pool during the scanning session. Upon the termination of the scanning session, the resources are disallowed such that they are available for allocation or assess again. The user may for example select between two or more predefined performance modes, such as a low-end mode, a default mode, or a high-end mode, giving access to predefined number and/or type of resources of the one or more resources.

Alternatively, the user may select the desired resources, such as the number of processors, graphics quality, a frame rate, and/or to include artificial intelligence (AI).

The predefined performance mode may thus comprise one of a low-end mode, a mid-range mode, a high-end mode, a premium mode, a user defined mode, or a default mode.

The user may select the desired predefined performance mode or select the desired resources via a user interface, which may be arranged on the intraoral scanning device or on a graphical user interface on a display which may be connected to a local computer, a smartphone, or a tablet, and may be arranged nearby in the vicinity of the intraoral scanning device.

The resource controller may then allow access for the intraoral scanning device to the resources of the resource pool according to the selected predefined performance mode or the selected resources. The resource controller may allow access for example by allocating one or more resources of the resource pool according to the selected predefined performance mode or to the selected resources.

Basing the access of the intraoral scanning device to the resources of the resource pool on a user input may allow the user of the intraoral scanning device to freely select a desired number, type, set, or combination of the resources of the resource pool In a situation, where the access is based on a user profile, the resource controller may be configured to allow access for the intraoral scanning device to a predefined number and/or type of resources, and thus operate the intraoral scanning device in a predefined performance mode.

For example the user, such as a dentist, may sign into the user's profile on a web portal, such as a website that may be connected to the intraoral scanning system, using for example personal credentials, and based on a predefined performance mode that may be associated with the user's profile, the resource controller provides access for the intraoral scanning device to a number and/or type of resources from the resource pool, that are associated to or correspond to the predefined performance mode. The predefined performance mode may be previously set as the default performance mode for the user's profile, and may differ for each user having a profile on the web portal that is associated with the intraoral scanning system. Several user profiles with different predefined performance modes may be run one at a time on the same intraoral scanning device. An intraoral scanning device may thus be operated with a low-end performance mode having access to a number and/type of resources from the resource pool for one user profile in one intraoral scanning session, and the same intraoral scanning device may be operated with a high-end performance mode having access to a larger number of resources and/or more types of resources from the resource pool, when a different user profile is signed in, in another intraoral scanning session. This might be a particular advantage in a situation where multiple users of a intraoral scanning system are performing different tasks requiring access to different resources. One example could be a denturist particularly focused on scanning edentulous patients with the aim of creating dentures and a dentist using the intraoral scanning system to perform diagnostic assessment which would require access to a different set of resources then performing edentulous scanning.

Basing the access of the intraoral scanning device to the resources of the resource pool on a user profile may allow the user of the intraoral scanning device to simply sign into the user's profile and operate the intraoral scanning device in a previously selected performance mode, without having to repeatedly select a desired number, type, set, or combination of resources, or having to repeatedly choose a performance mode, each time the user wants to use the intraoral scanning device.

In a situation where the access is based on a client profile, the resource controller may provide access for the intraoral scanning device to the resources of the resource pool according to a predefined performance mode, that may have been pre-set for the client profile. The client may be an intraoral scanning device. The client may further be a computer, a tablet, or a smartphone, that are connected to the intraoral scanning device or the intraoral scanning system, and may be located locally in the near vicinity of the intraoral scanning device, such as in a clinic of a dentist.

For example, when the intraoral scanning device is connected to the intraoral scanning system, for example using the internet, the resource controller recognizes that particular intraoral scanning devices, and provides access for that particular intraoral scanning device to a number and/or type of resources from the resource pool, that have been pre-defined or pre-set for it at an earlier stages, such as a default performance mode. The user of the intraoral scanning device, may via a user interface, such as buttons on the intraoral scanning, a display, or a graphical user interface, switch to another performance mode, which may be a predefined performance mode or directly select a different number and/or type of resources from the resource pool. The resource controller may then provide access for that particular intraoral scanning device to the different number and/or type of resources according to the most recently selected predefined performance mode or to the most recently selected number and/or type of resources, whenever that particular intraoral scanning device is connected to the intraoral scanning system.

Basing the access of the intraoral scanning device to the resources of the resource pool on a client profile may allow the user of the intraoral scanning device to simply connect the intraoral scanning device to the intraoral scanning system and operate the intraoral scanning device in a previously selected performance mode, without having to repeatedly sign in with a user profile, each time the user wants to use the intraoral scanning device.

The resource controller may be configured to receive a request from the intraoral scanning device or the intraoral scanning system, such as for example through a user input via a user interface or through a profile signing into a web portal or website of the intraoral scanning system, such as a user profile or client profile.

The user input may be a haptic signal through a touching of a user on a physical or digital button, or may be an input via a graphical user interface on a display connected to the intraoral scanning device or to the intraoral scanning system, such as on a software or a website, where the user input may indicate a user profile signing in.

The resource controller may further be configured to receive a request through the detection of an intraoral scanning device being connected to the intraoral scanning system. Upon receiving request, the resource controller may grant access for the intraoral scanning device to the resources or sending a signal to the resource pool to allow access.

The resource controller may further be configured to provide access for the intraoral scanning device to the resource of the resource pool based on a detection of an intraoral scanning device or a client, such as a computer, tablet, or smartphone that is connected to the intraoral scanning device, being connected to the intraoral scanning system.

The intraoral scanning device may thus be configured to access the resources of the resource pool on an on-demand basis.

The resource controller may be configured to disallow access to the one or more resources for the scanning session in response to the intraoral scanning device no longer utilizing the one or more resources.

The system or resource controller may be configured to disallow the intraoral scanning device from utilizing the one or more resources.

Having a resource controller that is configured to disallow access for the intraoral scanning device to the one or more resources of the resource pool may allow the resource controller to provide access or allocate the resources to other applications or other intraoral scanning devices that are connected to the intraoral scanning system, and may prevent having idle resources, when they may be used elsewhere.

The system may further comprise a conflict controller that may control a resource conflict between the intraoral scanning device and at least one other intraoral scanning device of the system that may compete for a same resource of the one or more resources.

The conflict controller may be an algorithm in a computer readably medium such as in a software and may be a part of the intraoral scanning system, such as in the intraoral scanning device, in a client device such as a computer, tablet, or smartphone that is connected to the intraoral scanning device, or in one or more of the one or more remote computers. The conflict controller may further be a part of the resource pool. The conflict controller may further be part of the resource manager. The conflict controller may be comprised in the resource pool or in one of the one or more remote computers.

Having a conflict controller may prevent a conflict between two or more intraoral scanning devices connected to the intraoral scanning system and competing for the same resource or the same set of resource.

The conflict controller may provide access to the one or more resources to the intraoral scanning device or to the at least one other intraoral scanning device based on a predefined performance mode for a scanning session of each of the respective intraoral scanning devices.

For example, if two intraoral scanning devices, one operating in a low-end performance mode and the other operating in a high-end performance mode, compete for the same resource, the conflict controller may be configured to allow the intraoral scanning device operating in a high-end performance mode to access that resource.

Allowing access to a resource based on a predefined performance mode may prevent a conflict between intraoral scanning devices competing for a same resource.

The conflict controller may provide access to the one or more resources based on the earliest of requests for providing access to the one or more resources or on a predetermined priority level of the scanning session. The predetermined priority level may be a ranking of a user profile or a client profile, or may be based on a user input.

The ranking may be based on a selected predetermined performance mode, a seniority level, or an urgency level.

For example, if two intraoral scanning devices send a request for accessing the same resource, the conflict controller will determine which of the two intraoral scanning device to get access to the resource based on which of the two requests has been sent or received earliest.

Allowing access to a resource based on a the earliest of requests or a predetermined priority level, may prevent a conflict between intraoral scanning devices competing for a same resource.

According to the aspect, an intraoral scanning system is provided that may comprise an intraoral scanning device that may be configured to acquire intraoral scan data from a three-dimensional dental object during a scanning session. The intraoral scanning device may comprise a processing unit that may be configured to process intraoral scan data of a patient and provide 2D image data and/or 3D image data. The intraoral scanning device may further comprise a wireless interface that may be configured to transmit the 2D image data and/or the 3D image data. The intraoral scanning device may further comprise a memory. The intraoral scanning system may further comprise one or more remote computers with a resource pool. The one or more remote computers may via a network of the system provide temporary access to the intraoral scanning device to one or more resources of the resource pool. The access for the intraoral scanning device to the one or more resources of the resource pool may be based on a predefined performance mode for the scanning session.

According to the aspect, an intraoral scanning system is provided that may comprise an intraoral scanning device that may be configured to acquire visible light information reflected from a three-dimensional dental object during a scanning session. The intraoral scanning system may further comprise one or more processors that may be operably connected to the intraoral scanning device. The one or more processors may be configured to receive visible light information from the intraoral scanning device. The intraoral scanning device may further be configured to determine, in real time, surface information from the visible light information, and may be configured to generate a three-dimensional (3D) surface model of a subject's teeth using the surface information. By determining surface information in real time, it is understood, that a time between sending the visible light information and determining surface information, which is the latency of this operation, is less than 1 second.

The intraoral scanning system may further be configured to generate the three-dimensional (3D) surface model of a subject's teeth using the surface information in real time, wherein the term "real time" in this context is to be understood as the beginning of the generation of the three-dimensional (3D) surface model, upon the receipt of the surface information. At least one of the one or more processors may be one or more remote computers that may have a resource pool. The one or more remote computers may via a network of the system, provide temporary access for the intraoral scanning device to one or more resources of the resource pool. The access may be based on a predefined performance mode of the scanning session and may be associated with the generation of the three-dimensional (3D) surface model of a subject's teeth using the surface information.

The predefined performance mode may be one of at least two predefined performance modes. Each of the at least two predefined performance modes may associate with a different number of resources from the resource pool and/or with a different type of resources from the resource pool.

Operating an intraoral scanning device using resources from a resource pool in one or more remote computers based on a predefined performance mode allows for an intraoral scanning device to be operated in different performance modes without having to select resources individually.

The one or more remote computers may further comprise a resource controller that may be configured to control an allocation of the resources.

The system may further be configured to de-allocate the resources for the scanning session in response to the intraoral scanning device no longer utilizing the one or more resources.

Having a resource controller that is configured to allocate and de-allocate resources of the resource pool to an intraoral scanning device may allow an intraoral scanning device to be operated in an on-demand basis.

In another example, the intraoral scanning system may further comprise a smartphone with a camera comprising one or more lenses or a digital camera that is configured to be connected to a wireless network and comprising one or more lenses. The intraoral scanning system may be configured to allow the smartphone or the digital camera to complement, assist, or partly substitute the intraoral scanning device, by allowing the smartphone or the digital camera to perform operations such as obtaining images or acquiring light information of the dental object.

Complementing, assisting, or partly substituting the intraoral scanning device with a smartphone or a digital camera may allow for acquiring light information using the smartphone or digital camera, and process the acquired information using the one or more resources of the resource pool. For example, a patient may use a smartphone that is connected to the intraoral scanning system to take pictures or a video of the patient's teeth, and the information may be processed by the one or more resources of the resource pool, without having to go to a dentist or to a clinic.

According to the aspect, a method for an intraoral scanning system is provided. The method may comprise the step of acquiring light information reflected from a three-dimensional dental object during a scanning session.

The acquiring may be conducted using optical equipment such as a light source, an optical lens, and an image sensor. The method may further comprise the step of determining in real time surface information from the light information via an intraoral scanning device. The acquired light information may be processed in real time using one or more processors. The processed information may allow for visualising the dental object on a display in real time. The method may further comprise the step of generating a three-dimensional (3D) surface model of a dental object using the surface information via one or more processors. The one or more processors may be at least partly one or more remote computers having a resource pool.

The one or more remote computers may be one or several interconnected computers, or may be a server, located remotely from the intraoral scanning device, and connected to the intraoral scanning device via a wireless network, such as the internet.

The resource pool may be resources, that may be configured to process light information, an may be hardware, such as one or more CPU's, software, such as one or more algorithms, or a combination of hardware and software.

The method may further comprise the step of providing temporary access for the intraoral scanning device to one or more resources of the resource pool based on a predefined performance mode of the scanning session. The predefined performance mode may be one of at least two predefined performance modes, wherein each of the at least two predefined performance modes may be configured to operate the intraoral scanning device with a different number of resources from the resource pool and/or a different type of resources from the resource pool.

The temporary access may be achieved for example by having the system configured to disallow access of the one or more resources for the scanning session in response to the intraoral scanning device no longer utilizing the one or more resources.

The method may further comprise the step of operating the intraoral scanning device with a number of resources of the resource pool and/or a type of resources from the resource pool that may be based on the predefined performance mode.

Providing a temporary access for the intraoral scanning device to one or more resources of the resource pool based on a predefined performance mode may allow for an on-demand solution for operating an intraoral scanning device.

The method may further base the predefined performance mode on one or more of: a user input, a user profile, and/or a client profile.

Basing the predefined performance mode on a user input, a user profile, or a client profile, allows the intraoral scanning system to identify the selected predefined performance mode using different options.

The method may further comprise the step of disallowing access for the intraoral scanning device to the one or more resources in response to an ending criteria. The ending criteria may be one or more of a measured value, a time limit, a minimum connection quality, an ending signal, or that the intraoral scanning device no longer utilizes the one or more resources.

Disallow the access for the intraoral scanning device to the one or more resources of the resource pool may allow the system to provide access or allocate the resources to other applications or other intraoral scanning devices that are connected to the intraoral scanning system, and may prevent having idle resources, when they may be used elsewhere.

The method may comprise the step of selecting the predefined performance mode that may comprise one of a low-end mode, a mid-range mode, a high-end mode, a premium mode, a user defined mode, or a default mode. The default mode may be pre-set by the manufacturer or by the user, and may be adjustable after being set.

Selecting one of the above mentioned modes may allow a user to operate an intraoral scanning device with a predefined performance mode and not having to select several resources individually.

The method may further apply for an intraoral scanning system wherein the one or more remote computers may be part of a cloud based resource pool or wherein the one or more resources may be part of one or more groups of interconnected computing systems. A such arrangement may allow the method to be applied for an intraoral scanning system wherein the resource for processing data are accessed on an on-demand basis.

The method may further comprise the step of identifying the predefined performance mode based on a user action.

The user action may be a user input using the intraoral scanning device or a display, may be connecting the intraoral scanning device to the intraoral scanning system, or may be signing in using a user profile or a client profile.

Identifying the predefined performance mode based on a user action allows the user to operate the intraoral scanning device in a predefine performance mode without having to select several processing resources individually.

Those skilled in the art will recognize still other aspects of the present application upon reading and understanding the attached description.

BRIEF DESCRIPTION OF THE FIGURES

Aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
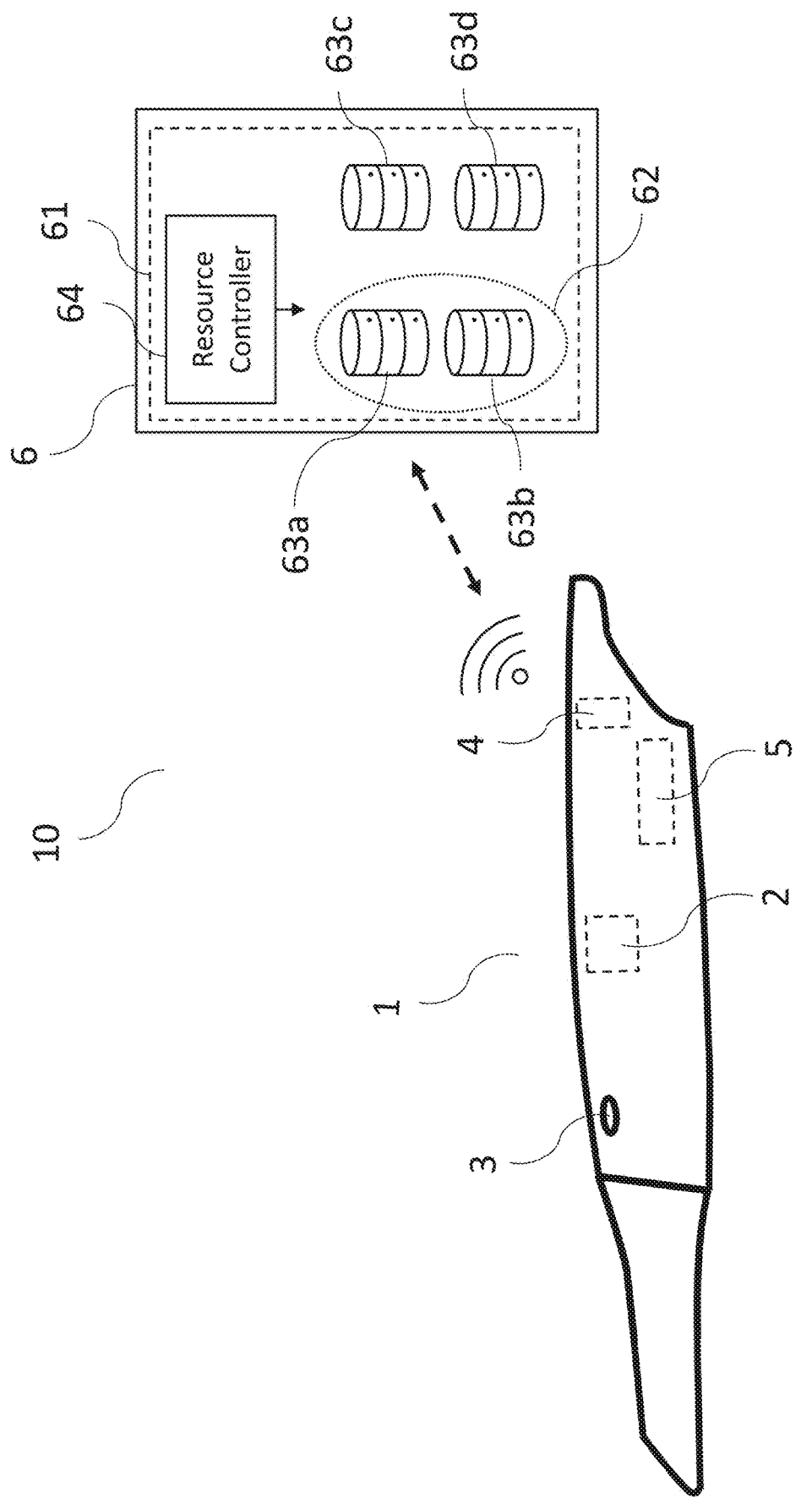
FIG. 1 illustrates an intraoral scanning system comprising an intraoral scanning device and a remote computer.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the devices, systems, mediums, programs and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A scanning for providing extra-oral scan data and/or intra-oral scan data may be performed by a dental scanning system that may include an intraoral scanning device such as the TRIOS series scanners from 3Shape A/S or a laboratory-based scanner such as the E-series scanners from 3Shape A/S. The dental scanning system may include a wireless capability as provided by a wireless interface such as a wireless network unit. The scanning device may employ a scanning principle such as triangulation-based scanning, confocal scanning, focus scanning, ultrasound scanning, x-ray scanning, stereo vision, structure from motion, optical coherent tomography OCT, or any other scanning principle. In an embodiment, the scanning device is capable of obtaining surface information by operated by projecting a pattern and translating a focus plane along an optical axis of the scanning device and capturing a plurality of 2D images at different focus plane positions such that each series of captured 2D images corresponding to each focus plane forms a stack of 2D images. The acquired 2D images are also referred to herein as raw 2D images, wherein raw in this context means that the images have not been subject to image processing. The focus plane position is preferably shifted along the optical axis of the scanning system, such that 2D images captured at a number of focus plane positions along the optical axis form said stack of 2D images (also referred to herein as a sub-scan) for a given view of the object, i.e., for a given arrangement of the scanning system relative to the object. After moving the scanning device relative to the object or imaging the object at a different view, a new stack of 2D images for that view may be captured. The focus plane position may be varied by means of at least one focus element, e.g., a moving focus lens. The scanning device is generally moved and angled relative to the dentition during a scanning session, such that at least some sets of sub-scans overlap at least partially, in order to enable reconstruction of the digital dental 3D model by stitching overlapping subscans together in real-time and display the progress of the virtual 3D model on a display as feedback to the user. The result of stitching is the digital 3D representation of a surface larger than that which can be captured by a single sub-scan, i.e., which is larger than the field of view of the 3D scanning device. Stitching, also known as registration and fusion, works by identifying overlapping regions of 3D surface in various sub-scans and transforming sub-scans to a common coordinate system such that the overlapping regions match, finally yielding the digital 3D model. An Iterative Closest Point (ICP) algorithm may be used for this purpose. Another example of a scanning device is a triangulation scanner, where a time varying pattern is projected onto the dental object and a sequence of images of the different pattern configurations are acquired by one or more cameras located at an angle relative to the projector unit.

Colour texture of the dental object may be acquired by illuminating the object using different monochromatic colours such as individual red, green and blue colours or my illuminating the object using multichromatic light such as white light. A 2D image may be acquired during a flash of white light.

Generally, the process of obtaining surface information in real time of a dental object to be scanned requires the scanning device to illuminate the surface and acquire high number of 2D images. Typically, a high-speed camera is used with a framerate of 300-2000 2D frames pr second dependent on the technology and 2D image resolution. The high amount of image data needed to be handled by the scanning device to either directly forward the raw image data stream to an external processing device or performing some image processing before transmitting the data to an external device or display. This process requires that multiple electronic components inside the scanner is operating with a high workload thus requiring a high demand of current.

The scanning device comprises one or more light projectors configured to generate an illumination pattern to be projected on a three-dimensional dental object during a scanning session. The light projector(s) preferably comprises a light source, a mask having a spatial pattern, and one or more lenses such as collimation lenses or projection lenses. The light source may be configured to generate light of a single wavelength or a combination of wavelengths (mono- or polychromatic). The combination of wavelengths may be produced by using a light source configured to produce light (such as white light) comprising different wavelengths. Alternatively, the light projector(s) may comprise multiple light sources such as LEDs individually producing light of different wavelengths (such as red, green, and blue) that may be combined to form light comprising the different wavelengths. Thus, the light produced by the light source may be defined by a wavelength defining a specific colour, or a range of different wavelengths defining a combination of colours such as white light. In an embodiment, the scanning device comprises a light source configured for exciting fluorescent material of the teeth to obtain fluorescence data from the dental object. Such a light source may be configured to produce a narrow range of wavelengths. In another embodiment, the light from the light source is infrared (IR) light, which is capable of penetrating dental tissue. The light projector(s) may be DLP projectors using a micro mirror array for generating a time varying pattern, or a diffractive optical element (DOF), or back-lit mask projectors, wherein the light source is placed behind a mask having a spatial pattern, whereby the light projected on the surface of the dental object is patterned. The back-lit mask projector may comprise a collimation lens for collimating the light from the light source, said collimation lens being placed between the light source and the mask. The mask may have a checkerboard pattern, such that the generated illumination pattern is a checkerboard pattern. Alternatively, the mask may feature other patterns such as lines or dots, etc.

The scanning device preferably further comprises optical components for directing the light from the light source to the surface of the dental object. The specific arrangement of the optical components depends on whether the scanning device is a focus scanning apparatus, a scanning device using triangulation, or any other type of scanning device. A focus scanning apparatus is further described in EP 2 442 720 B1 by the same applicant, which is incorporated herein in its entirety.

The light reflected from the dental object in response to the illumination of the dental object is directed, using optical components of the scanning device, towards the image sensor(s). The image sensor(s) are configured to generate a plurality of images based on the incoming light received from the illuminated dental object. The image sensor may be a high-speed image sensor such as an image sensor configured for acquiring images with exposures of less than $1/1000$ second or frame rates in excess of 250 frames pr. Second (fps). As an example, the image sensor may be a rolling shutter (CCD) or global shutter sensor (CMOS). The image sensor(s) may be a monochrome sensor including a colour filter array such as a Bayer filter and/or additional filters that may be configured to substantially remove one or more colour components from the reflected light and retain only the other non-removed components prior to conversion of the reflected light into an electrical signal. For example, such additional filters may be used to remove a certain part of a white light spectrum, such as a blue component, and retain only red and green components from a signal generated in response to exciting fluorescent material of the teeth.

The wireless network unit is configured to wirelessly connect the intraoral scanning system to a network comprising a plurality of network elements including at least one network element configured to receive the processed data.

The dental scanning system preferably further comprises a processor configured to generate scan data (such as extra-oral scan data and/or intra-oral scan data) by processing the two-dimensional (2D) images acquired by the scanning device. The processor may be part of the scanning device. As an example, the processor may comprise a Field-programmable gate array (FPGA) and/or an Advanced RISC Machines (ARM) and/or a x86 processor and/or a combination of FPGA, ARM, and/or x86 processors located on the scanning device. The scan data comprises information relating to the three-dimensional dental object. The scan data may comprise any of: 2D images, 3D point clouds, depth data, texture data, intensity data, colour data, and/or combinations thereof. As an example, the scan data may comprise one or more-point clouds, wherein each point cloud comprises a set of 3D points describing the three-dimensional dental object. As another example, the scan data may comprise images, each image comprising image data e.g., described by image coordinates and a timestamp (x, y, t), wherein depth information can be inferred from the timestamp. The image sensor(s) of the scanning device may acquire a plurality of raw 2D images of the dental object in response to illuminating said object using the one or more light projectors. The plurality of raw 2D images may also be referred to herein as a stack of 2D images. The 2D images may subsequently be provided as input to the processor, which processes the 2D images to generate scan data. The processing of the 2D images may comprise the step of determining which part of each of the 2D images are in focus in order to deduce/generate depth information from the images. The depth information may be used to generate 3D point clouds comprising a set of 3D points in space, e.g., described by cartesian coordinates (x, y, z). The 3D point clouds may be generated by the processor or by another processing unit. Each 2D/3D point may furthermore comprise a timestamp that indicates when the 2D/3D point was recorded, i.e., from which image in the stack of 2D images the point originates. The timestamp is correlated with the z-coordinate of the 3D points, i.e., the z-coordinate may be inferred from the timestamp. Accordingly, the output of the processor is the scan data, and the scan data may comprise image data and/or depth data, e.g., described by image coordinates and a timestamp (x, y, t) or alternatively described as (x, y, z). The scanning device may be configured to transmit other types of data in addition to the scan data. Examples of data include 3D information, texture information such as infra-red (IR) images, fluorescence images, reflectance colour images, x-ray images, and/or combinations thereof.

FIG. 1 illustrates an intraoral scanning system 10 comprising an intraoral scanning device 1 and a remote computer 6. The intraoral scanning device 1 is illustrated comprising a processing unit 2 configured to process intraoral scan data of a patient and provide 2D image data and/or 3D image data, a wireless interface 4 configured to transmit the 2D image data and/or the 3D image data: a user interface 3 that may comprise physical and/or virtual buttons and/or a touch panel and/or a display, and a battery 5 configured to power at least the processing unit 2 and the wireless interface 4. The intraoral scanning device 1 is connected to the remote computer 6 via a network through the wireless interface 4. The remote computer 6 is seen represented by a box 6. A resource pool 61 represented by a dotted box is shown comprising resources 63a-d. A dotted oval 62 is shown encircling two resources defining a set of resources. The resource pool 61 is further shown comprising a resource controller 64 configured to control access for the intraoral scanning device 1 to the resources 63a-d. In another example, the intraoral scanning system 10 may comprise two or more remote computers that are interconnected, each remote computer comprising one or more resources, and wherein the intraoral scanning device 1 may be connected to the remote computers and may get access to the resources of the remote computers.

Figure 2:
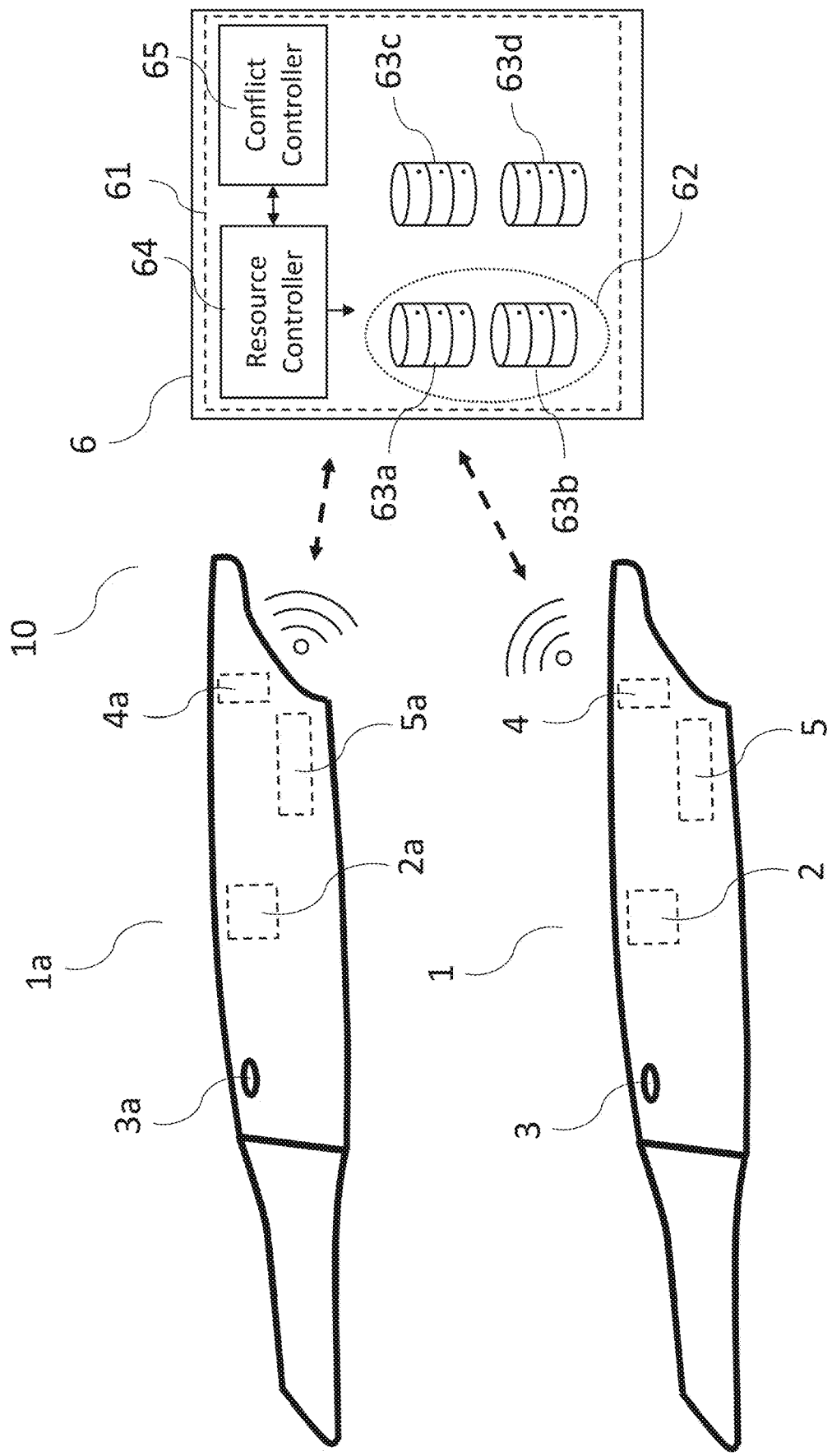
FIG. 2 illustrates the intraoral scanning system comprising two intraoral scanning devices and a remote computer.

FIG. 2 illustrates the intraoral scanning system 1 from FIG. 1 comprising another intraoral scanning device 1a connected to the remote computer 6. The figure further shows a conflict controller 65 comprised in the resource pool 61 and configured to prevent a conflict between the two intraoral scanning devices 1, 1a, when competing for a same resource of the resources 63a-d. The conflict controller 65 prevents a conflict by determining which of the two intraoral scanning devices 1, 1a is to get access to which resource of the resources 63a-d and which the two intraoral scanning devices 1, 1a are competing for, based on a predetermined criteria.

Figure 3:
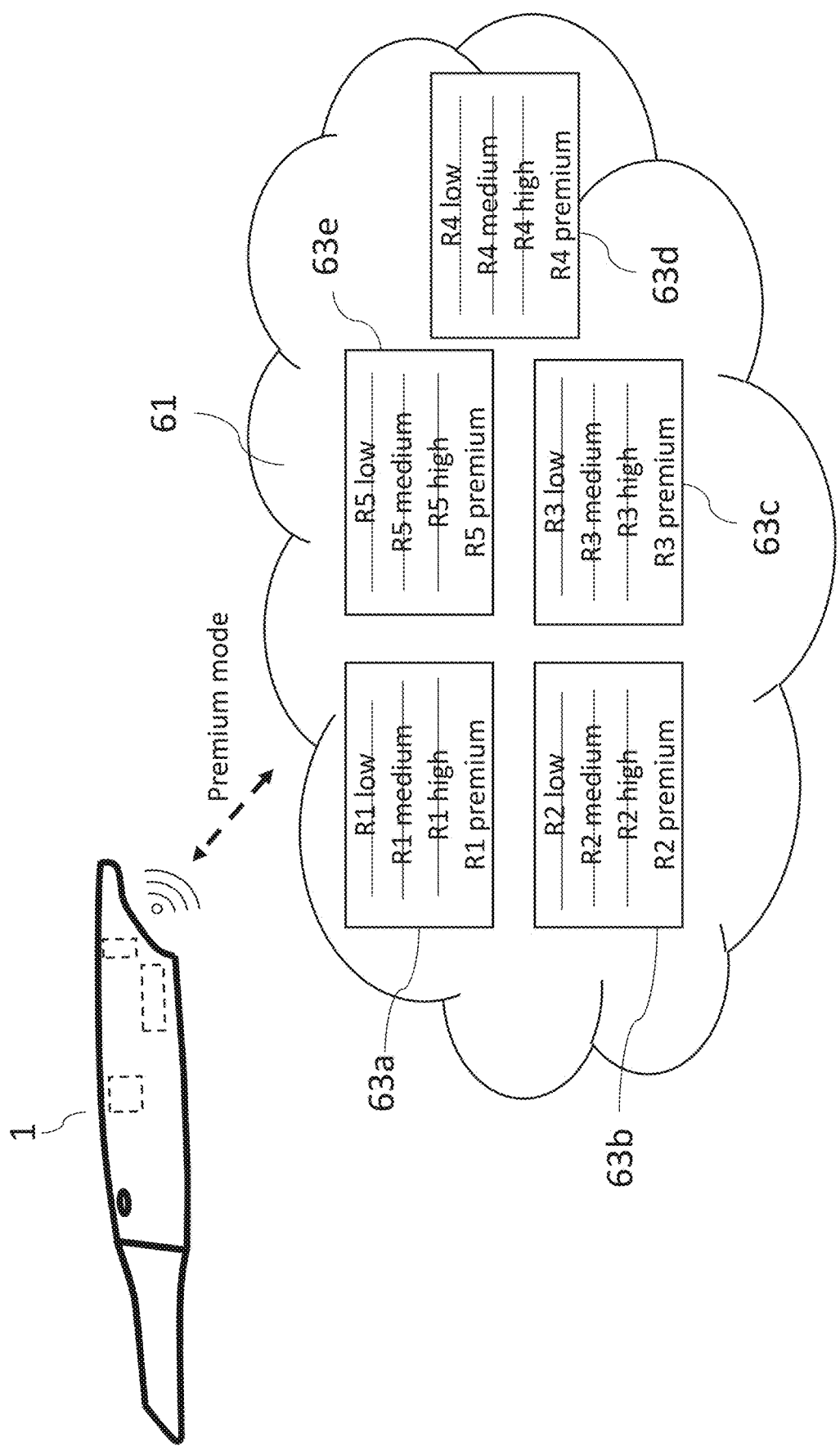
FIG. 3 schematically illustrates a resource pool comprising resources in a "cloud" representing the remote computer.

FIG. 3 schematically illustrates the intraoral scanning device 1 connected to the resource pool 61 in a "cloud" representing a remote computer (illustrated in FIGS. 1 and 2 having ref. no. 6). The intraoral scanning device 1 is illustrated being connected to the "cloud" via a wireless network.

In the example shown in FIG. 3, the resources 63a-e are five different types of resources. There may be several resources of each type of resource. For example, the resource R1 may be a processor, and there may be four of these processors referred to as R1 low, R1 medium, R1 high, R1 premium, and in combination referred to as 63a. Processors R1 low-R1 premium may be similar processors, in which case when the intraoral scanning device 1 is operating in a premium performance mode, may have access to all of the processors R1 low-R premium. In another example, where R1 low is a processor having the lowest specs and R1 premium having the highest specs, when the intraoral scanning device 1 is operating in a premium performance mode, the intraoral scanning device 1 may have access to R1 premium.

In an example, the resources 63b may be algorithms for improving graphics. The resource R2 low may be an algorithm that is configured to improve graphics less than the algorithm R2 premium is configured to.

In FIG. 3, a situation is illustrated where the intraoral scanning device 1 is operating in a premium performance mode, where all premium resources R1 premium-R5 premium of each resource 63a-e of the resource pool 61 are selected.

In yet another example, the intraoral scanning device 1 may be operating in a performance mode where for example R1 premium, R2 high, R3 low, R5 medium are selected, while the resource R4 has not been selected.

Figure 4A:
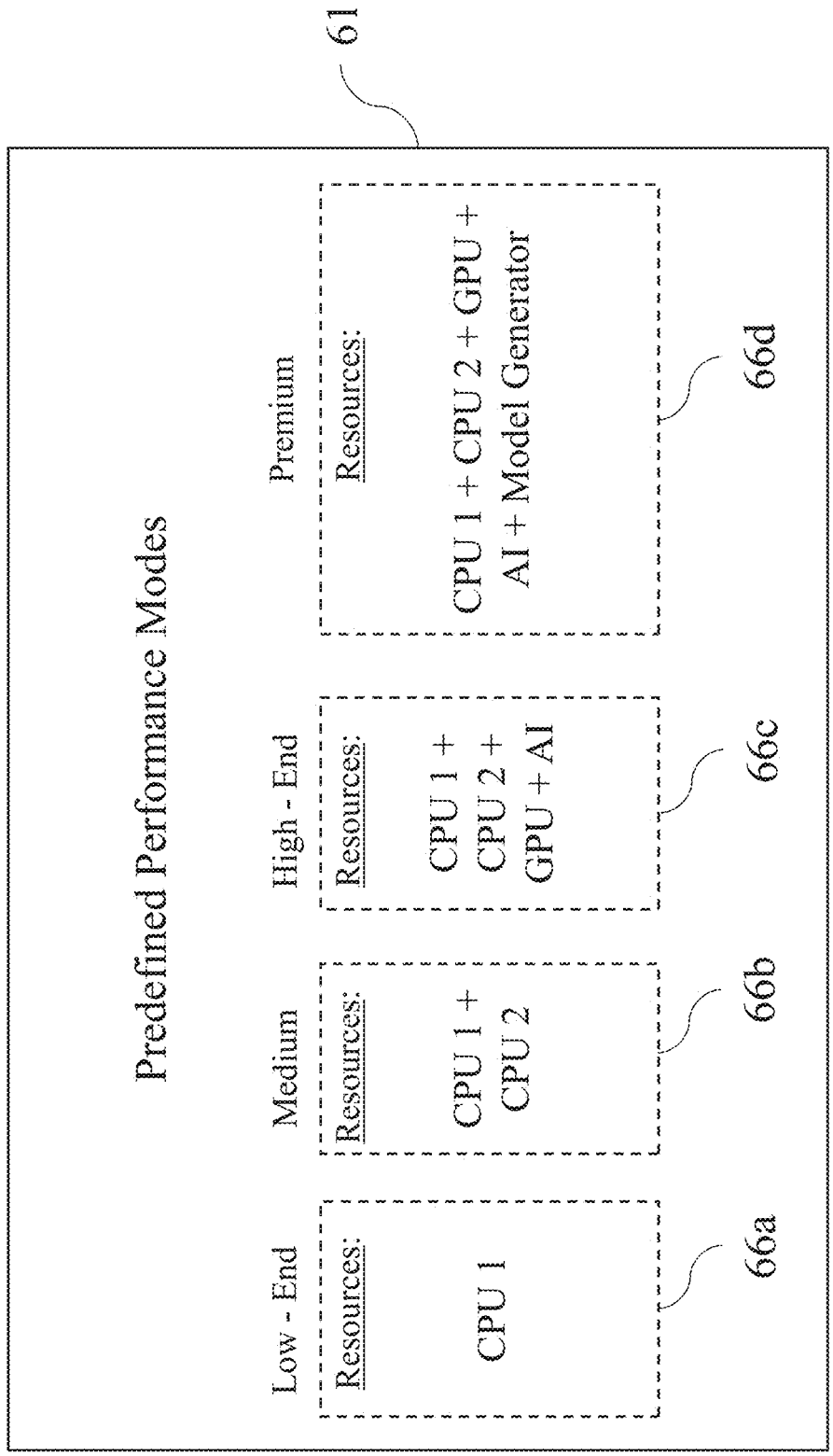
FIG. 4A schematically illustrates an example overview of an exemplary number and type of resources from the resource pool accessible for different exemplary predefined performance modes.

FIG. 4A schematically illustrates an example overview of an exemplary number and type of resources from the resource pool 61 accessible for different exemplary predefined performance modes 66a-d. In the figure, four predefined performance modes 66a-d are illustrated. Each predefined performance mode 66a-d is illustrated having access to a number and type of resource from a resource pool 61.

In the figure, a Low-End predefined performance mode 66a is shown having access to a resource being a processor (CPU1). Furthermore, a Medium predefined performance mode 66b is shown having access to two processor resources (CPU1 and CPU2), which allows the intraoral scanning device 1 to operate with a higher processing performance than when operating in the Low-End predefined performance mode 66a, only having access to one of the processor two resources (CPU1 and CPU2). A High-End predefined performance mode 66c is illustrated further having access to different types of resources. The High-End predefined performance mode 66c is shown having access not only to the two processing resources (CPU1 and CPU2), but further having access to a graphics processing resource (GPU) and a software or algorithm resource (AI), which may be an algorithm configured to implement artificial intelligence, for example for the purpose of processing data and/or generating a virtual model on a display. The figure further shows a Premium predefined performance mode 66d, further having access to a model generator (Model Generator), which may be a software or an algorithm, which may be a module, that may be configured to improve the process of generating a virtual model on a display. The user of the intraoral scanning device 1 may choose any of these predefined performance modes 66a-d, or may select the resources 63a-e individually as illustrated in FIG. 3, for operating the intraoral scanning device 1.

Figure 4B:
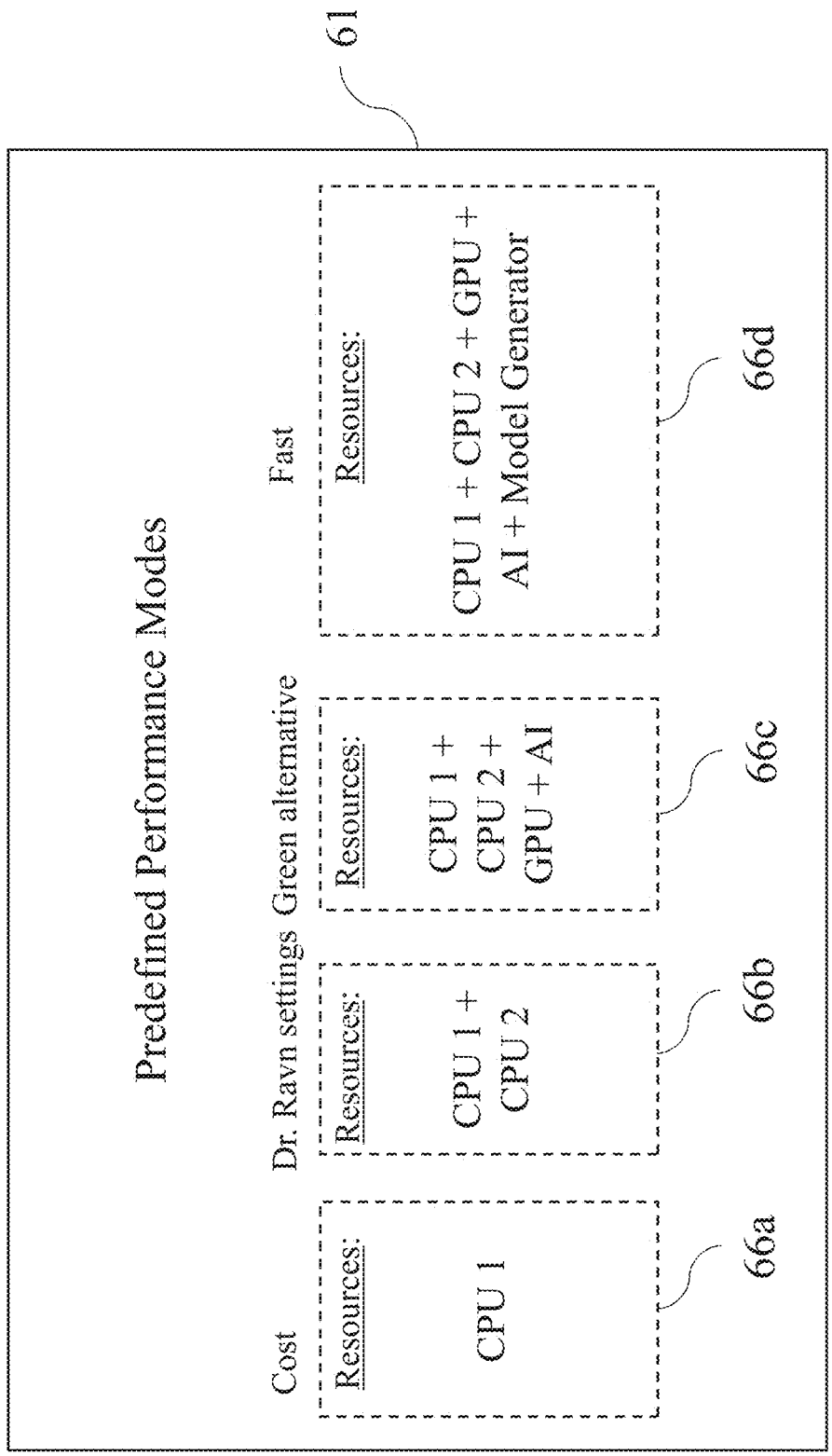
FIG. 4B schematically illustrates another example overview than the one shown in FIG. 4A.

FIG. 4B schematically illustrates another example overview of an exemplary number and type of resources from the resource pool 61 accessible for different exemplary predefined performance modes 66*a*-*d*. In the figure, four predefined performance modes 66*a*-*d* are illustrated. Each predefined performance mode 66*a*-*d* is illustrated having access to a number and type of resource from a resource pool 61.

In the figure, a "Cost" predefined performance mode 66*a* is shown having access to a resource being a processor (CPU1). Furthermore, a "Dr. Ravn settings" predefined performance mode 66*b* is shown having access to two processor resources (CPU1 and CPU2), which indicates that this performance mode is the pre-set default mode for Dr. Ravn, which in this example is the user, and which allows the intraoral scanning device 1 to operate with a higher processing performance than when operating in the "Cost" predefined performance mode 66*a*, only having access to one of the processor two resources (CPU1 and CPU2). A "Green alternative" predefined performance mode 66*c* is illustrated further having access to different types of resources, and which indicates that this predefined performance mode is considered an environmentally friendly performance mode. The "Green alternative" predefined performance mode 66*c* is shown having access not only to the two processing resources (CPU1 and CPU2), but further having access to a graphics processing resource (GPU) and a software or algorithm resource (AI), which may be an algorithm configured to implement artificial intelligence, for example for the purpose of processing data and/or generating a virtual model on a display, and/or for operating the intraoral scanner or the resources in a more environmentally friendly mode. The figure further shows a "Fast" predefined performance mode 66*d*, further having access to a model generator (Model Generator), which may be a software or an algorithm, which may be a module, that may be configured to improve the process of generating a virtual model on a display, and indicates that this performance mode allows the intraoral scanning device to operate faster than the other predefined performance modes.

The user of the intraoral scanning device 1 may choose any of these predefined performance modes 66*a*-*d*, or may select the resources 63*a*-*e* individually as illustrated in FIG. 3, for operating the intraoral scanning device 1.

Figure 5:
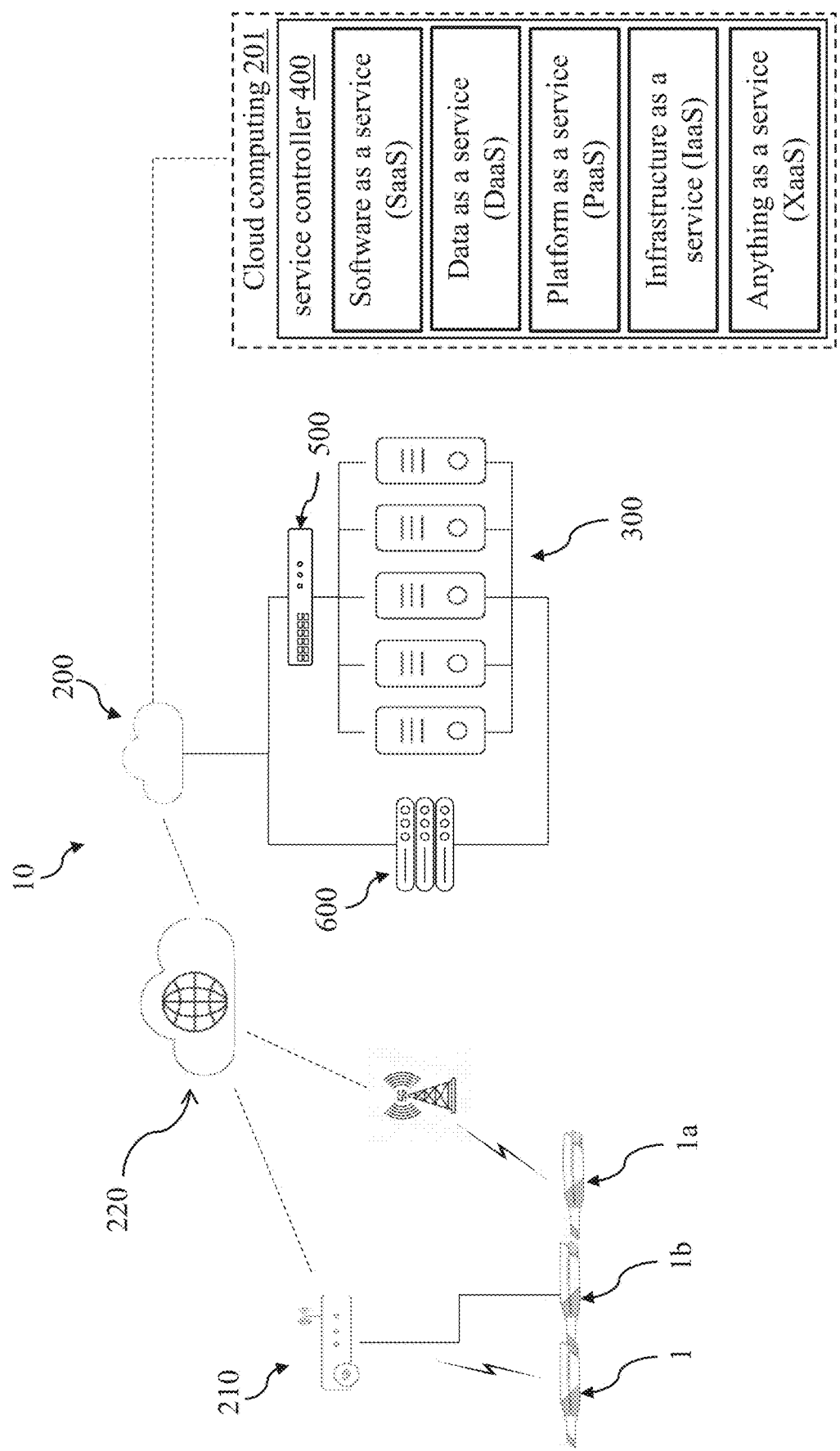
FIG. 5 schematically illustrates another example of the intraoral scanning system connecting three intraoral scanning devices to remote resources.

FIG. 5 shows another example of the intraoral scanning system 10 wherein a first intraoral scanning device 1, a second intraoral scanning device 1*a*, and a third intraoral scanning device 1*b*, are connected to the intraoral scanning system 10 via the internet connection 220. The first intraoral scanning device 1 is connected to the Internet 220 via a router 210 located in the same room or in the same building as the intraoral scanning device 1, such as in a dentist's clinic. The intraoral scanning device 1 is in this example connected to the Wi-Fi network of the router 210 via the wireless interface 4 of the intraoral scanning device 1. The second intraoral scanning device 1*a* is shown connected directly to the Internet 220. The second intraoral scanning device 1*a* may comprise a sim card or an eSIM (embedded-SIM, which is a programmable SIM card that is embedded directly into the intraoral scanning device 1*a*), may be connected to an adapter configured to receive a sim card, or any other method for connecting a device directly to the Internet 220. The third intraoral scanning device 1*b* is shown connected to the internet 220 via a wired connection, such as a network/data cable, to the router 210. The first intraoral scanning device 1, the second intraoral scanning device 1*a*, and the third intraoral scanning device 1*b*, are connected to a cloud computing system 200 of the intraoral scanning system 10 via the Internet 220. The cloud computing system 200 is shown comprising resources 300 which in this example are several computers 300 (or a computer cluster 300) and a network storage 600, which may for example be a server, that are located remotely relative to the first, second, and third intraoral scanning devices 1, 1*a*, and 1*b*. The several computers 300 are shown connected to the cloud computing system 200 and interconnected with each other via an ethernet switch 500, and further connected to the network storage 600. The figure thus shows the intraoral scanning system 10 providing access for the first, second, and third intraoral scanning devices 1, 1*a*, 1*b*, to the resources 300 via the cloud computing system 200.

In this example, the several computers 300 comprise hardware resources and software resources. The hardware resources may be computational processing units (CPU's), graphics processing units (GPU's), etc. The software resources may be applications, software, or algorithms that are configured to for example generate a three-dimensional (3D) model, add colour to scan data, implement artificial intelligence (AI), etc. The software resources may be comprised in the several computers 300 and/or in the network storage 600.

The cloud computing system 200 is shown comprising a service controller 400 which is configured to control the operations of the cloud computing system 200 according to different service models. The different service models are configured to control access for the three intraoral scanning devices 1, 1*a*, 1*b*, to the resources 63*a*-*e* of the cloud computing system 200.

The service controller 400 is thus configured to control the resources 63*a*-*e* and control the access thereto.

The access to the remote resources may be provided according to a XaaS (Anything as a Service) business model, more specifically, according to an IaaS (Infrastructure as a Service), an PaaS (Platform as a Service), or a Saas (Software as a Service), which are business models where services are provided to a user or a client on-demand.

In this example the service models are shown to be "Software as a service (Saas)", "Data as a service (DaaS)", "Platform as a service (PaaS)", "Infrastructure as a service (IaaS)", and "anything as a service (XaaS), which indicates that other service models may further be applied.

The software as a service (SaaS) is a software licensing and delivery model in which software is licensed on a subscription basis and is centrally hosted. SaaS is also known as "on-demand software" and Web-based/Web-hosted software.

The data as a service (DaaS) is a cloud-based software tool used for working with data, such as managing data in a data warehouse or analysing data with business intelligence. It is enabled by software as a service (SaaS).

Like all "as a service" (aaS) technology, DaaS builds on the concept that its data product can be provided to the user on demand, regardless of geographic or organizational separation between provider and consumer.

The platform as a service (PaaS) is a cloud computing service that allows customers to provision, instantiate, run, and manage a modular bundle comprising a computing platform and one or more applications, without the complexity of building and maintaining the infrastructure typically associated with developing and launching the application(s): and to allow developers to create, develop, and package such software bundles.

The infrastructure as a service (IaaS) is a cloud computing service model by means of which computing resources are hosted in a public, private, or hybrid cloud. Pools of hypervisors within the cloud operational system can support large numbers of virtual machines as well as the ability to scale services up and down according to customers' varying requirements.

In a continuation of the previous example, the cloud computing system 200 is shown, via the internet 220, providing access to a remote dedicated scanning software-as-a-service (SaaS) capable of executing processing instructions on a one or more processors of the several computers 300 or computer cluster 300. The intraoral scanning device 1 in a clinic is shown wirelessly connected to the Internet through the router 210 via a Local Area Network.

The intraoral scanning device 1 may be connected to a local application or directly to a remote application. The local application may provide a communication controller capable of forwarding and receiving data and instructions back and forth between the remote application and the intraoral scanning device 1. The local application may additionally be beneficial of information received from the remote application are to be distributed to other devices, such as a monitor, tablet or phone for rendering.

The remote application may in this example be an application configured to implement Artificial Intelligence in processing acquired data or to generate a 3D model.

As an example of an Infrastructure as a Service (IaaS) model, a system will be described, using FIG. 5, providing remote processing resources. The application may be stored in the network storage 600.

The cloud computing system 200 is shown, via the Internet 220, providing access to remote CPUs as a Infrastructure as a Service (IaaS) inside the several computers 300 or computer cluster 300, capable of processing acquired scan data or light information. An intraoral scanning device 1 in a clinic is shown wirelessly connected to the internet through the router 210 via a Local Area Network. The intraoral scanning device 1 is connected directly to the remote CPUs. The remote CPUs are thus provided as remote resources on demand based on an (IaaS) model.

Figure 6:
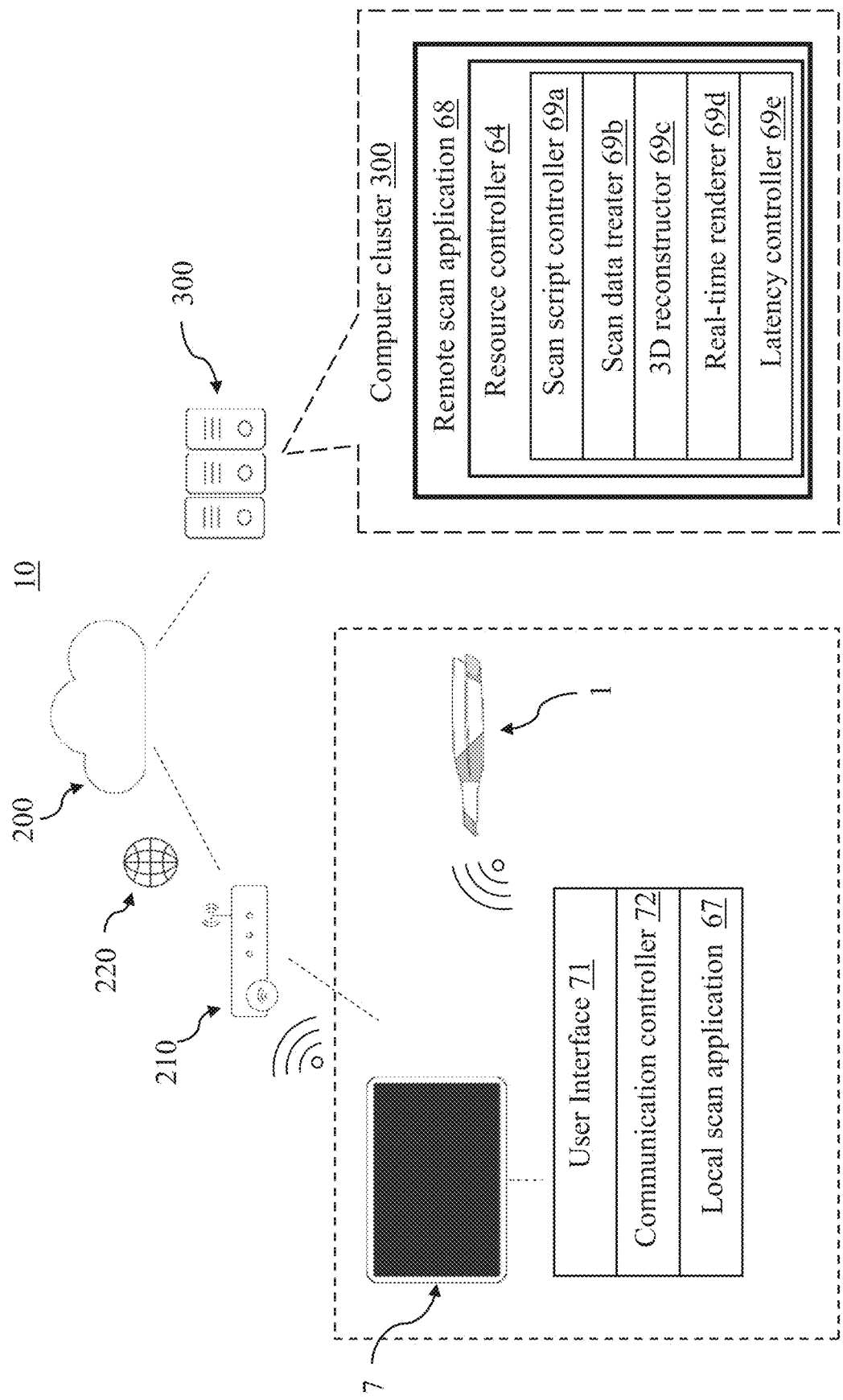
FIG. 6 schematically illustrates yet another example of the intraoral scanning system.

FIG. 6 shows yet another example of an intraoral scanning system 10 where an intraoral scanning device 1 is operably connected to a cloud computing system 200. In the example, the intraoral scanning device 1 is wirelessly connected to a display unit 7 through a wireless interface 4 of the intraoral scanning device 1. The display unit 7 in the present example is a tablet. The display unit 7 comprises a user interface 71 which is configured to receive user input, such as a touch screen, a keyboard, a mouse, or other pointing devices. The display unit 7 further comprises a communication controller 72, which is configured to control communication between the display unit 7 and the intraoral scanning device 1, and control the communication between the display unit 7 and remote resources that are part of a computer cluster 300 of the cloud computing system 200, through an Internet connection 220. The display unit 7 further comprises a local scan application 67. The local scan application 67 is in the present example a software that is configured to be operated on the display unit 7 using processing resources of the display unit 7 and is configured to be controlled by a user of the display unit 7, and may perform operations such as selection, viewing options, manipulation of a 3D model, send and receive information between the display unit 7 and the intraoral scanning device 1 and/or between the display unit 7 and the computer cluster 300, and/or between the intraoral scanning device 1 and the computer cluster 300, etc. A communication controller 72 may further be provided in the local scan application 67 and capable of forwarding and receiving data and instructions back and forth between a remote application 68 (described further below) and the intraoral scanning device 1.

The local scan application 67 is configured to distribute information received from the remote scan application 68 to other devices, such as the display unit 7 or a phone for rendering. The local scan application 67 is further configured to provide an initial login for the UI (user interface) for a user of the intraoral scanning device 1, such that the user is able to perform a selection of a scanning session linked to one or more predefined performance modes of the resource controller 64 running in the cloud computing system 200. The display unit 7 and the intraoral scanning device 1 are wirelessly connected to the Internet 220 through a Wi-Fi connection of a dental clinic to a router 210. In another example, the display unit 7 and/or the intraoral scanning device 1 are connected to the cloud computing system 200 directly by being directly connected to the Internet 220 by using for example a sim card or an eSIM comprised in the display unit 7 and/or the intraoral scanning device 1. In the present example, the remote resources of the cloud computing system 200 are comprised in a computer cluster 300. The computer cluster 300 may be several computers interconnected with each other or may be a server. The computer cluster 300 comprises a remote scan application 68, which may be one or more algorithms, such as a software. Thus, the cloud computing system 200 provides access to a remote scanning software as a service (SaaS) capable of executing processing instructions on one or more processors of the computer cluster 300. The remote scan application 68 comprises a resource controller 64, which is configured to control access to the resources of the computer cluster 300. The resources comprise a scan script controller 69a, a scan data treater 69b, a 3D reconstructor 69c, a real-time renderer 69d, and a latency controller 69e.

The figure further shows that the resource controller 64 in the remote scan application 68 has access to several components or resources which may be associated with the generation of a tree-dimensional 3D surface model. Such components or resources may be:

- a scan script controller 69a, which is configured to forward instructions to the intraoral scanning device 1 on how to obtain surface information, and may control the 3D frame rate of the intraoral scanning device 1 and the scan modality, such as fluorescence scanning, infrared scanning, white light scanning, and scan pattern configuration etc.,
- a scan data treater 69b, such as for example a trained neural network adapted to recognize features in scan data which is helpful for the reconstruction of the 3D model. An example of a such trained neural network is Edentulous AI, which can identify the bone ridge, where teeth used to be positioned, and mark those points in the sub scan for more accurate 3D model reconstruction. Another example is the Soft tissue removal AI, which removes tongue and lips directly in the sub scans,
- a 3D reconstructor 69c, which is configured to receive the sub scan data which comprises small patches of surface data, and stitch the scan patches together to form a 3D model of the object to be scanned. This process is computationally complex and the more computer nodes are allocated to this task the faster the model can be reconstructed, and eventually displayed to the user as feedback,
- a real-time renderer 69d, which is configured to rendered, in-real time, the reconstructed model, and to distribute and display the model on a screen in the clinic where the scan data originate from. This provides real-time feedback of the progress and completeness of the scanning session, and a latency controller 69*e*, which is configured to control the latency of data transfer to and from the scanning device and other local devices. The delay may be controlled by the distance between different computer clusters and or to between one processor and the scanning device another option is to control data package losses in communication between remote and local applications or between one or more remote applications. Network delay is one of the main factors which can degrade the Quality of Experience (QoE) of the users of network services. Delays between 150 ms (milliseconds)—and 400 ms are acceptable.

Figure 7:
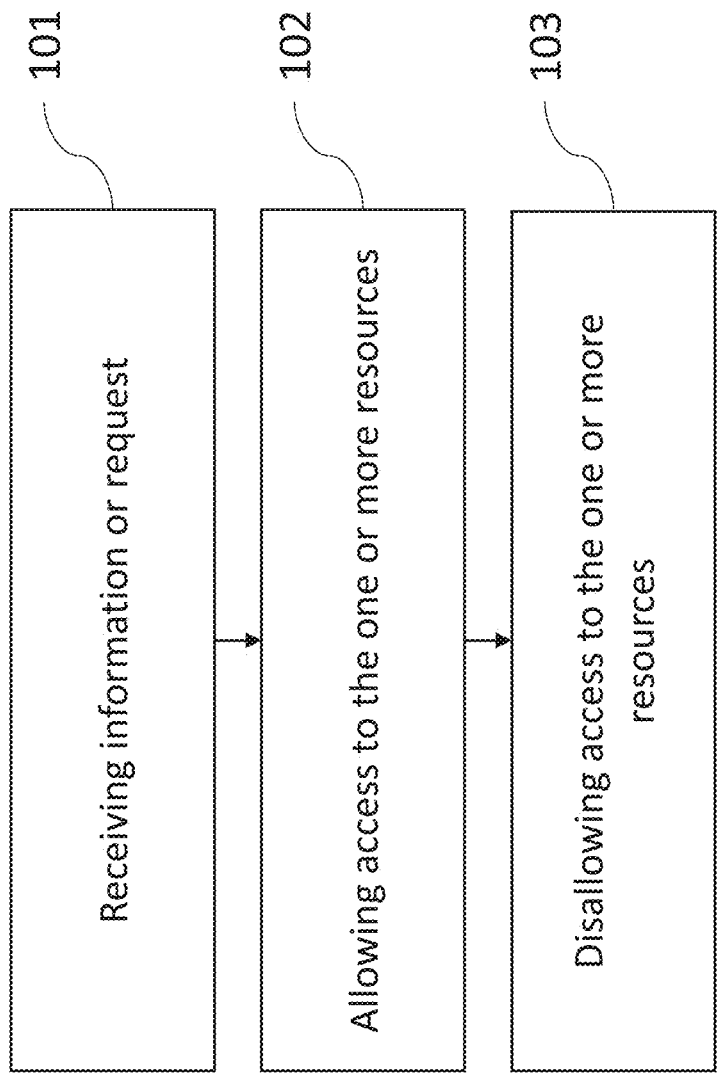
FIG. 7 shows a table with an overview of a method for the intraoral scanning system comprising steps for allowing and disallowing access to the resources from the resource pool.

FIG. 7 shows a table with an overview of a method for the intraoral scanning system comprising steps for allowing and disallowing access to the resources from the resource pool 61 (shown in FIGS. 1-4). The figure illustrates a first step 101 comprising receiving information or a request. The information may be a request or a detection of a signing in with a profile or a connection of a device.

FIG. 7 illustrates a first step 101. In this first step 101, a request may be received at one or more remote computers 6 or at a resource pool 61 requesting access to resources 63*a-d* (shown in FIG. 1). The request may further be received at the resource controller 64 (shown in FIGS. 1-2) or elsewhere in the intraoral scanning system 10. The first step 101 may further comprise a detection of a signing into an account or a profile, which may be registered in the intraoral scanning system 10. The intraoral scanning system 10 may recognize the profile or account which is signing in, and based on that information, determining whether to give access for the intraoral scanning device 1 to the resources 63*a-d* or not, and in the case of giving access, which resources 63*a-d* to give access to, if the access is based on a predefined performance mode and not an individual selection. The first step 101 may further comprise detection of a connected device, such as an intraoral scanning device 1 or a client device connected to the intraoral scanning system 10, such as a computer, a tablet, or smartphone, connected to an intraoral scanning device 1.

FIG. 7 further illustrates a second step 102. In the second step 102, a situation is described where the intraoral scanning system 10 allows the intraoral scanning device to access one or more of the resources 63*a-d* of the resource pool 61. The second step 102 may be performed by the resource controller 64.

FIG. 7 further illustrates a third step 103. In the third step 103, a situation is described where the intraoral scanning system 10 disallows the intraoral scanning device to access one or more of the resources 63*a-d* of the resource pool 61. The third step 103 may be performed by the resource controller 64. In the third step 103, the resource controller 64 may disallow access based on an ending criteria. The ending criteria may be a request or a detection. In case of a request, the resource controller 64 may receive a request that may be sent by the intraoral scanning device 1 or the intraoral scanning system 10 indicating that the intraoral scanning device 1 no longer utilizes the one or more resources 63*a-d*, or that the intraoral scanning session has ended. In the case of the ending criteria being a detection, the resource controller may detect a disconnection of the intraoral scanning device 1, or a thereto connected client device such as a computer, a tablet, or a smartphone, or that a predefined time limit has been reached or exceeded, or other any other detection methods known by a person skilled in the art.

Although some embodiments have been described and shown in detail, the disclosure is not restricted to such details, but may also be embodied in other ways within the scope of the subject matter defined in the following claims. In particular, it is to be understood that other embodiments may be utilized, and structural and functional modifications may be made without departing from the scope of the present invention.

Benefits, other advantages, and solutions to problems have been described herein with regard to specific embodiments. However, the benefits, advantages, solutions to problems, and any component(s)/unit(s) that may cause any benefit, advantage, or solution to occur or become more pronounced are not to be construed as critical, required, or essential features or components/elements of any or all the claims or the invention. The scope of the invention is accordingly to be limited by nothing other than the appended claims, in which reference to a component/unit/element in the singular is not intended to mean "one and only one" unless explicitly so stated, but rather "one or more." A claim may refer to any of the preceding claims, and "any" is understood to mean "any one or more" of the preceding claims.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e., to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The step of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

The invention claimed is:

1. An intraoral scanning system comprising:
   an intraoral scanning device configured to acquire light information reflected from a three-dimensional dental object during a scanning session, and
   one or more processors operably connected to the intraoral scanning device, the one or more processors are configured to:
   determine, in real time, surface information from the light information, and
   generate a three-dimensional surface model of a dental object using the surface information,
   wherein at least one of the one or more processors is one or more remote computers, and the one or more remote computers includes a resource pool, and wherein the intraoral scanning system provide temporary access for the intraoral scanning device to one or more resources of the resource pool based on a predefined performance mode of the scanning session,
   wherein the predefined performance mode is one of at least two predefined performance modes, and wherein each of the at least two predefined performance modes is configured to operate the intraoral scanning device with a different number of resources from the resource pool and/or with a different type of resources from the resource pool.

2. The intraoral scanning system according to claim 1, wherein the predefined performance mode is determined based on a user input, a user profile, or a client profile.

3. The intraoral scanning system according to claim 1, wherein the system further comprises a resource controller configured to control the access to the one or more resources.

4. The intraoral scanning system according to claim 3, wherein the resource controller is configured to disallow access to the one or more resources for the scanning session in response to the intraoral scanning device no longer utilizing the one or more resources.

5. The intraoral scanning system according to claim 1, wherein the one or more remote computers are part of a cloud computing resource pool.

6. The intraoral scanning system according to claim 1, the system, comprising:
   a conflict controller that controls a resource conflict between the intraoral scanning device and at least one other intraoral scanning device of the system competing for a same resource of the one or more resources.

7. The intraoral scanning system according to claim 6, wherein the conflict controller provides access to the one or more resources to the intraoral scanning device or to the at least one other intraoral scanning device based on a predefined performance mode for a scanning session of each of the respective intraoral scanning devices.

8. The intraoral scanning system according to claim 1, wherein the system, via a network of the system, provide temporary access to the intraoral scanning device to a set of resources from the resource pool based on the predefined performance mode of the scanning session.

9. The intraoral scanning system according to claim 8, wherein the set of resources comprises a combination of hardware resources, a combination of software resources, or a combination of hardware and software resources.

10. A method for an intraoral scanning system comprising the steps of:
    acquiring light information reflected from a three-dimensional dental object during a scanning session,
    determining in real time surface information from the light information via an intraoral scanning device,
    generating a three-dimensional surface model of a dental object using the surface information via one or more processors, the one or more processors being at least partly one or more remote computers having a resource pool,
    providing temporary access for the intraoral scanning device to one or more resources of the resource pool based on a predefined performance mode of the scanning session, the predefined performance mode being one of at least two predefined performance modes, each of the at least two predefined performance modes being configured to operate the intraoral scanning device with a different number of resources from the resource pool and/or a different type of resources from the resource pool,
    operating the intraoral scanning device with a number of resources of the resource pool and/or a type of resources from the resource pool based on the predefined performance mode.

11. The method according to claim 10, wherein the predefined performance mode being based on one or more of a:
    user input,
    user profile, and/or
    client profile.

12. The method according to claim 10, further comprising the step of disallowing access for the intraoral scanning device to the one or more resources in response to an ending criteria.

13. The method according to claim 12, wherein the ending criteria being one or more of a measured value, a time limit, a minimum connection quality, an ending signal, or that the intraoral scanning device no longer utilizing the one or more resources.

14. The method of claim 10, wherein the one or more remote computers being part of a cloud based resource pool.

15. The method of claim 10, comprising the step of identifying the predefined performance mode based on a user action.

* * * * *